United States Patent [19]
Billyard

[11] Patent Number: 5,757,321
[45] Date of Patent: May 26, 1998

[54] APPARATUS AND METHOD FOR CLIPPING PRIMITIVES USING INFORMATION FROM A PREVIOUS BOUNDING BOX PROCESS

[75] Inventor: Adam Michael Billyard, London, United Kingdom

[73] Assignee: Canon Kabushiki Kaisha, Japan

[21] Appl. No.: 704,815

[22] Filed: Aug. 28, 1996

Related U.S. Application Data

[63] Continuation of Ser. No. 129,386, Sep. 30, 1993, abandoned.

[30] Foreign Application Priority Data

Oct. 2, 1992 [GB] United Kingdom ............ 9220792

[51] Int. Cl.⁶ ........................................... G06T 15/30
[52] U.S. Cl. .................... 345/434; 345/433; 345/427
[58] Field of Search ...................... 395/118–122, 125–7, 395/133–4, 501, 6

[56] References Cited

U.S. PATENT DOCUMENTS

| | | | |
|---|---|---|---|
| 3,816,726 | 6/1974 | Sutherland et al. | 395/124 |
| 3,889,107 | 6/1975 | Sutherland | 395/124 |
| 4,862,392 | 8/1989 | Steiner | 364/522 |
| 4,928,250 | 5/1990 | Greenberg et al. | 395/126 |
| 5,025,407 | 6/1991 | Gulley et al. | 364/754 |
| 5,058,042 | 10/1991 | Hanna et al. | 395/127 |
| 5,363,475 | 11/1994 | Baker | 395/122 |
| 5,574,835 | 11/1996 | Duluk, Jr. et al. | 395/121 |

FOREIGN PATENT DOCUMENTS

| | | |
|---|---|---|
| 0152741 | 8/1985 | European Pat. Off. . |
| 2194656 | 3/1988 | United Kingdom . |
| 2194715 | 3/1988 | United Kingdom . |

OTHER PUBLICATIONS

Computer Graphics Principles and Practice, Second Edition, Foley, Van Dam, Feiner and Hughes, Section 15, 2, 3.

ACM Transaction on Graphics, vol. 3, No. 1, Jan. 1984, pp. 52–69, Hank Weghorst et al.

X. Zhou et al., "A Volume Sorting Hidden–Surface Algorithm", Computer Software & Applications Conference, Sep. 20, 1989, pp. 693–699.

J. Clark. "Hierarchical Geometric Models for Visible Surface Algorithms", Communications of the ACM, vol. 19, No. 10, Oct. 1976, pp. 547–554.

*Primary Examiner*—Phu K. Nguyen
*Assistant Examiner*—Rudolph J. Buchel
*Attorney, Agent, or Firm*—Fitzpatrick, Cella, Harper & Scinto

[57] ABSTRACT

In apparatus for processing image data representing multidimensional objects, data is stored defining the position of a light source, a viewing position, an arrangement of polygons defining an object and a local transform for transforming said object into viewable 3-dimensional space. Processing means defines the extent of points for an object in each dimension, performs said local transform on said points and determines the extent to which said points are transformed into viewing space. Thus, an evaluation can be made as to where the object will lie in viewing space before polygons are transformed. Culling may then be performed at the object level, rather than at the polygon level.

9 Claims, 11 Drawing Sheets

$$I(a) = B(a) \cdot K(a)$$

$$I(d) = I(l) \cdot K(d) \, \underline{N} \cdot \underline{L}$$

$$I(s) = I(l) \cdot K(s)(\underline{H} \cdot \underline{N})^n$$

$$I(RGB) = I(a) + I(d) + I(s)$$

$$I(d) = I(l) \cdot K(d) \, \underline{N} \cdot \underline{L}$$

$$I(s) = I(l) \cdot K(s) \cdot (\underline{N} \cdot \underline{L})^n$$

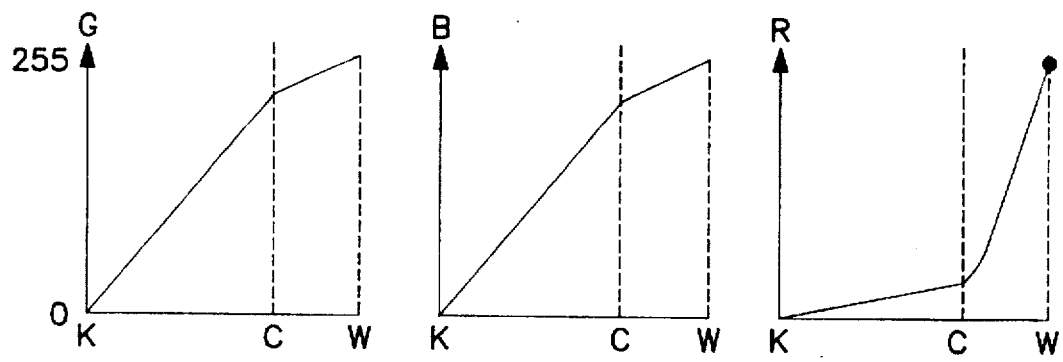
FIG. 20A  FIG. 20B  FIG. 20C
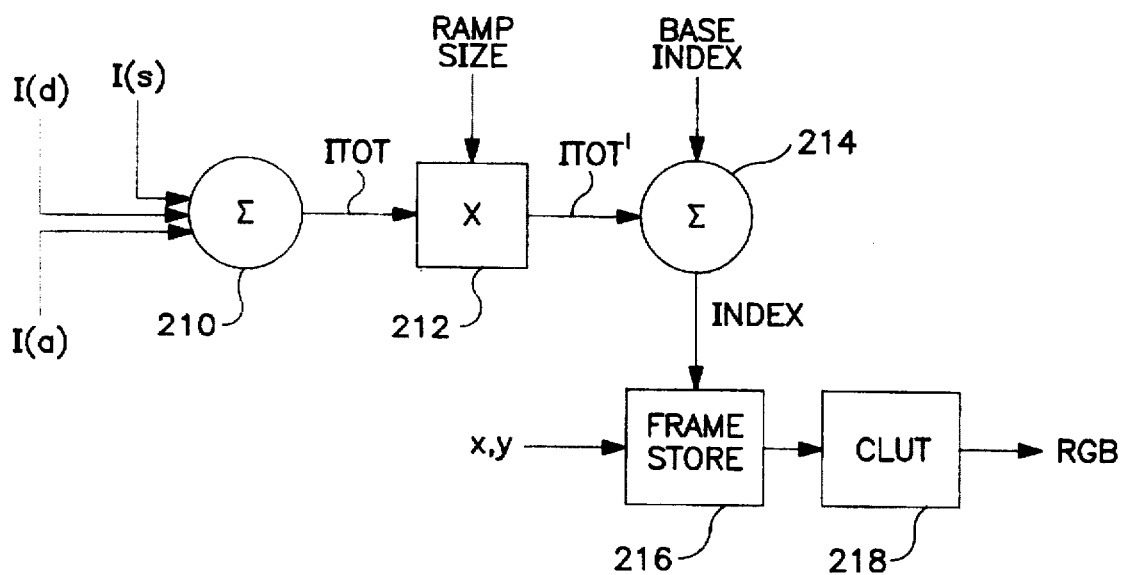
FIG. 21

5,757,321

APPARATUS AND METHOD FOR CLIPPING PRIMITIVES USING INFORMATION FROM A PREVIOUS BOUNDING BOX PROCESS

This application is a continuation of application Ser. No. 08/129,386, filed Sep. 30, 1993, now abandoned.

FIELD OF THE INVENTION

The present invention relates to apparatus and methods for processing image data.

In particular, the present invention relates to apparatus and methods for processing image data for use in interactive 3-dimensional graphics environments. The present invention also relates to apparatus and methods for generating 2-dimensional representations of 3-dimensional objects, and to image signals and recordings generated by such methods.

BACKGROUND OF THE INVENTION

Systems are known which are capable of synthesizing 2-dimensional images in response to data defining elements within a 3-dimensional space. The final 2-dimensional result may consist of a very large number of coloured picture elements (pixels) which may be viewed on a monitor or printed onto an image carrying medium.

In interactive systems arranged to generate data representing a 3-dimensional space, objects appear to move within the 3-dimensional space in response to input commands. Thus, in such systems a machine is required to render a 2-dimensional image from data representing a 3-dimensional space and, in addition, the machine is also required to perform this operation repeatedly as the position and/or orientation of objects, light sources and the view point change in response to input commands. Typically, in an interactive environment, the machine is required to produce output images at a rate of between five to fifteen per second. In more highly powered environments, output images are produced at video rate (60 frames per second) and the machine is said to operate in real time.

In known machines, a detailed example of which will be described later, a significant amount of hardware is required if acceptable images are to be produced at an interactive rate. Thus, computational demands have placed significant constraints on 3-dimensional interactivity, thereby limiting the extent to which interactive 3-dimensional graphics may be employed.

It is an object of the present invention to provide apparatus and methods for processing image data, which require reduced computational overheads.

It is a further object of the present invention to provide apparatus and methods capable of producing acceptable images at an interactive rate but with lower computational demands.

In known 3-dimensional graphics processing systems, a great deal of data is processed unnecessarily, in that it does not provide a contribution to the final output image, because such systems are inflexible and are not capable of selective processing.

It is an object of the present invention to provide an improved system. In particular, it is an object of the present invention to provide an improved system with a level of selectivity, thereby enabling it to reject data which does not require further processing.

SUMMARY OF THE INVENTION

According to an aspect of the present invention, a bounding volume is defined to enclose each object in its own local space, and this bounding volume is transformed into viewable 3-dimensional space. Only if part of the bounding volume falls within a visible part of the viewable space is the object selected for further processing. By this means, the need to transform all the primitives which go to make up a complex object can be avoided, if it is determined by means of the bounding volume that no part of the object falls within the visible part of space. In other embodiments, it may still be necessary to transform the primitives of the object into viewable space, but it may not be necessary to perform lighting calculations on them, for example.

In particular embodiments, the invention provides an apparatus for processing image data representing multi-dimensional objects, said apparatus including processing means and data storage means wherein said storage means stores data defining: the position of a light source; a viewing position; an arrangement of primitives defining one of said objects in a local space; and a local transform for transforming said object into a viewable 3-dimensional space, characterised in that said processing means includes: means for defining a bounding volume for the object; means for performing said local transform on said bounding volume; means for determining the extent to which said bounding volume is transformed into a visible part of said viewable space; and means for selecting the object for further processing depending on the result of said determination.

The bounding volume may for example be a sphere, or a cuboidal bounding box defined by the extent of the object in the three dimensions of said local space. The viewable space may have a shape which takes account of perspective view from a view point at a finite distance.

The invention further provides methods of processing image data for the generation of 2-dimensional images representing 3-dimensional objects. The invention yet further provides image signals and recordings of images in whatever form, that have been generated using the methods of the invention.

Other features and advantages of the invention will be apparent from the description of the embodiments below. The invention yet further provides image signals and recordings in whatever form that have been generated in accordance with the principles of the invention as set forth above.

It may be noted that the use of bounding volumes per se is known from various documents in the art. For example, in GB-A-2 194 656 of IBM, world space is divided into boxes and these are transformed into the local space of a solid primitive to discover if a given volume of world space includes any part of the primitive. On the other hand, in EP-A-0 152 741 the object is first projected into viewing space, and then a bounding box is drawn around the projection of the object in viewing space, and tests are performed in viewing space on this bounding box.

Embodiments of the invention will now be described, by way of example only, with reference to the accompanying drawings, in which:

FIG. 20 illustrates three primary colour component ramps suitable for implementing the ramp of FIG. 19; and FIG. 21 illustrates the calculation of pixel colour values using an alternative colour look-up table.

A CONVENTIONAL INTERACTIVE GRAPHICS SYSTEM

Figure 1:
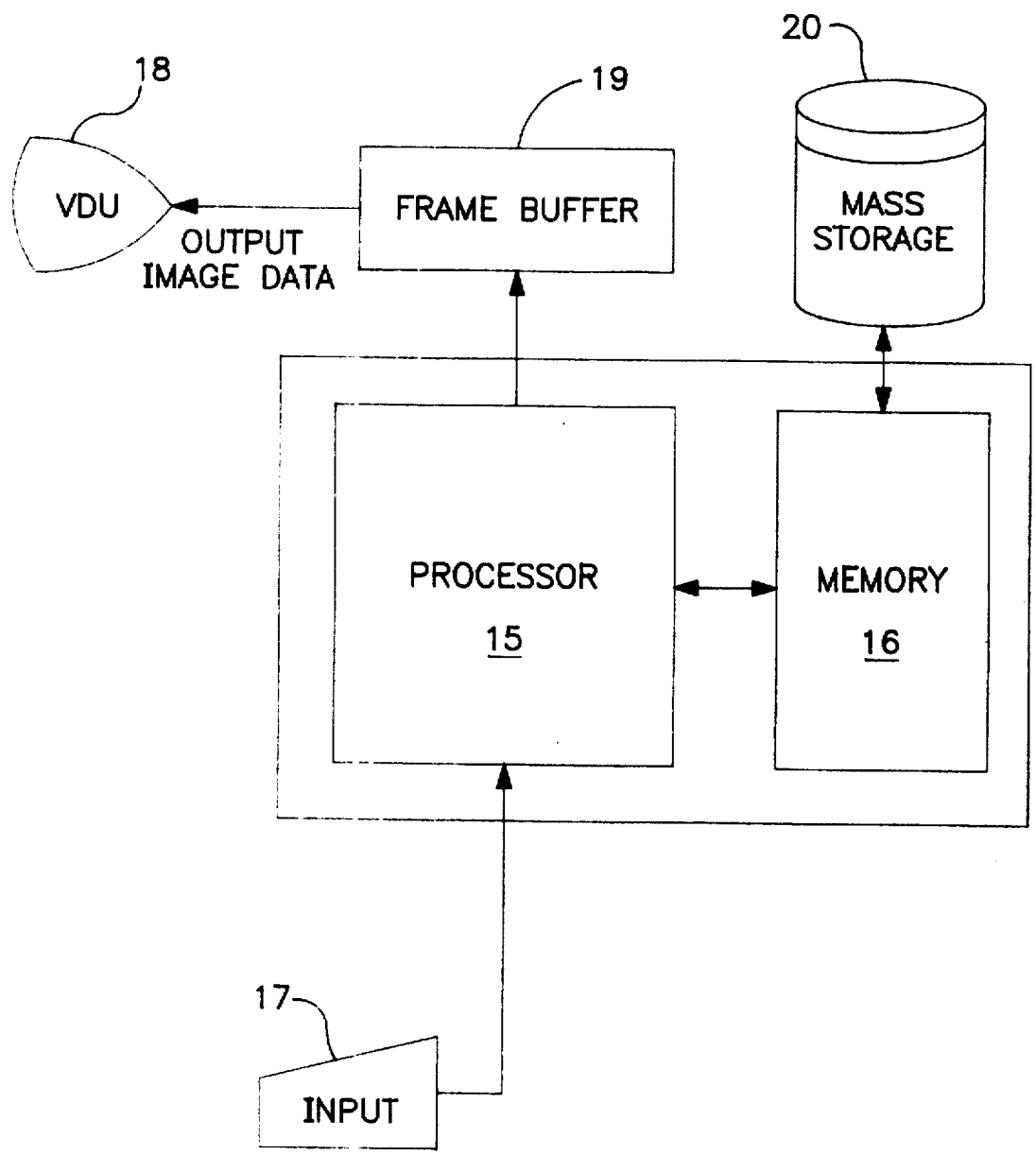
FIG. 1 illustrates an environment for implementing embodiments of the present invention.

An environment for synthesizing 3-dimensional data, viewing 2-dimensional data derived from said 3-dimensional data and interactively modifying said 3-dimensional data is shown in FIG. 1. A processor 15 is arranged to write data to and read data from a memory device 16. Data stored in the memory device 16 may define 3-dimensional image data, 2-dimensional image data, instructions to the processor 15 and other types of data which may or may not be relevant to interactive 3-dimensional graphics.

In addition, the processor 15 receives input data from input devices 17, said devices consisting of a manually operable keyboard and a position sensitive device, such as a mouse, a tracker-ball or a digitising tablet with a stylus etc.

2-dimensional images are displayed on a visual display unit 18, which receives output image data at video rate, by raster scanning a frame buffer 19. The visual display unit 18 may have a definition of 1,000 lines with 1,000 pixels on each line, requiring frame buffer 19 to include 1,000,000 pixel locations.

For the bulk transfer of program data and image data, a mass storage device 20 is provided, such as a hard magnetic disk, optical disk or tape drive etc.

The combination of processor 15, memory device 16, storage device 20, frame buffer 19 and the visual display unit 18 may be commercially available as a complete system. For example, the configuration may consist of a Sparc workstation, supplied by Sun Microsystems Inc. of the United States.

In response to input commands from device 17, image data is written to the memory device 16 defining positions in a virtual 3-dimensional space. A plurality of 3-dimensional spaces are provided and transformations are made between them, the nature of which will be detailed later. In response to control data from the memory device 16, the processor 15 is arranged to generate a 2-dimensional view from data representing 3-dimensional space. 2-dimensional views of this type are built up in the memory 16 and supplied to the frame buffer at a rate of between five to fifteen frames per second. The frame buffer 19 is then read at video rate, such that data supplied to the buffer may be read more than once, so as to maintain a stable image.

Figure 2:
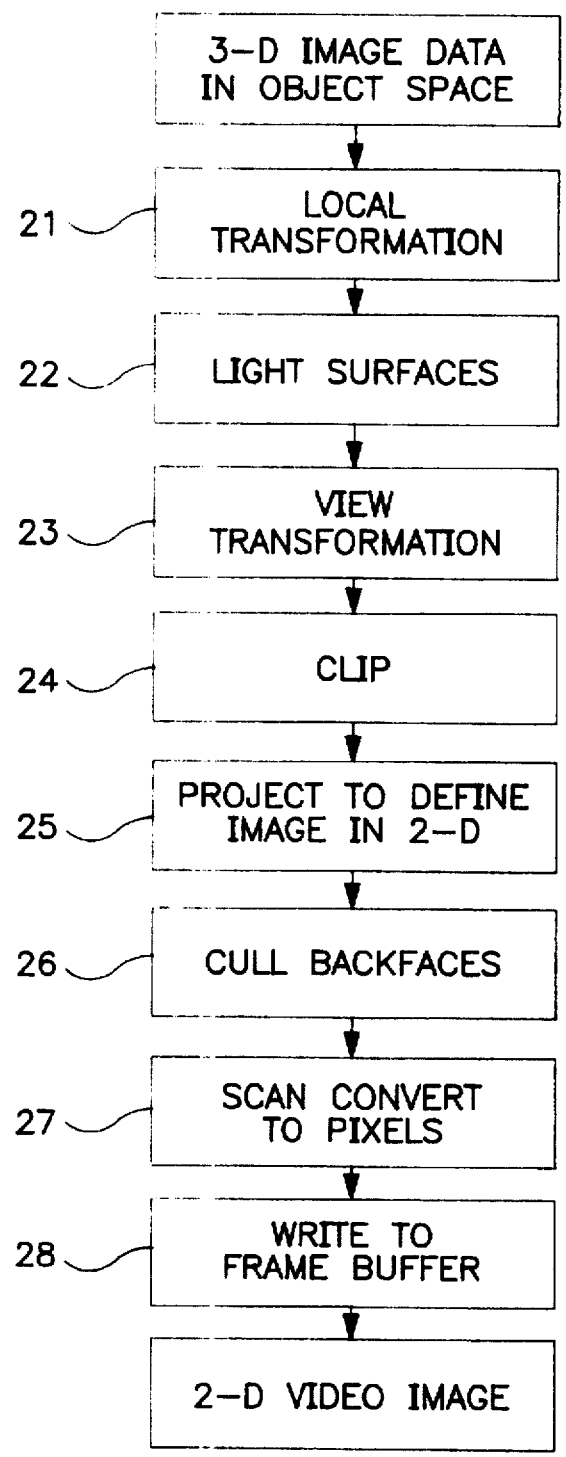
FIG. 2 illustrates a conventional approach to interactive 3-dimensional graphics.

A conventional system for interactive 3-dimensional graphics is shown in FIG. 2. 3-dimensional objects are defined in terms of a plurality of polygons. Each polygon is in turn defined as a plurality of connected points, referred to herein as vertices. Thus, objects are created by joining polygons, having coincident vertices along an edge common to both of the polygons.

A 3-dimensional object is defined within its own object space, that is to say, the vertices of polygons are positioned with respect to the object's own coordinate axes.

Figure 3:
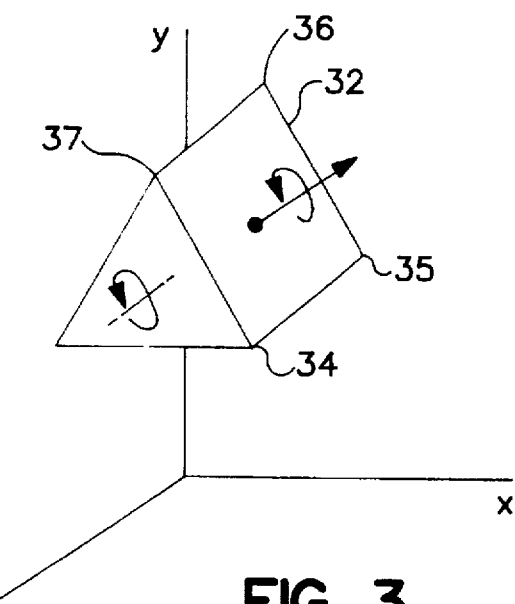
FIG. 3 represents an object fabricated from polygons in its own object space.

An object space of this type is shown in FIG. 3. In accordance with convention, the origin of the X, Y and Z axes is positioned at the back bottom left and the vertices of polygons are given x, y and z Cartesian coordinates with reference to this origin.

In FIG. 3, a simple object is shown, made up of five polygons. Data is stored in memory defining the position of each vertex of each polygon. For example, polygon 32 has four vertices 34, 35, 36 and 37, the coordinates of which are listed in a table. By convention, the vertices of a polygon are defined in an order obtained by traversing around the polygon in an anticlockwise direction.

In addition to this positional information, additional information relating to the polygon is also stored. This includes a definition of a unit normal vector 38, a vector extending from the centre of the polygon in a direction perpendicular, i.e. normal to the plane of the polygon, away from its front face, and extending a length equal to unity within the coordinate reference frame. Furthermore, data is also stored relating to the nature of the surface of the polygon and in particular parameters are stored defining how the polygon will react with modelled light directed thereon.

Within a modelling space, in addition to objects, light sources are also provided and a viewing position is selected. Light sources model light falling upon the polygons, which in turn have lighting characteristics, that is to say, the polygons have colour and brightness responsive to the amount of light falling upon them and the nature of their surface.

Thus, within the table defining the polygons of the object shown in FIG. 3, data is stored relating to a coefficient of ambient light K(a), a coefficient of diffuse light K(d) and a coefficient of specular light K(s).

The coefficient of ambient light effectively defines how bright a polygon is when no local light sources are provided. The coefficient of diffuse light is a parameter which defines the polygon's characteristic relating to the diffusion of light in response to a local light source. Similarly, the K(s) defines characteristics relating to specular highlights. Thus, the presence of specular highlights effectively represents how shiny a polygon is and improves realism.

Returning to the system detailed in FIG. 2, the 3-dimensional image data in object space, as shown in FIG. 3, undergoes a local transformation which transforms objects into modelling space, at step 21. At step 22, the polygon surfaces are lit by processing data relating to the position of light sources in modelling space and the lighting parameters of each polygon. Thereafter, at step 23, the modelling space is transformed into a viewing space, the geometry of which differs depending upon whether an isometric view or a perspective view is required.

The view transformation will identify a particular field of view, which will usually cover less than the whole modelling space. Therefore, at step 24 a clipping process is performed to remove polygons which fall outside the field of view.

Up until this stage, data processed by the processor and read from the memory defines 3-dimensional coordinate locations. At step 25 the projected view is analyzed to define an image in 2-dimensions, thus, in isometric views, the z dimension is rejected and in perspective views the x and y dimensions are scaled, so as to take account of the rejected z dimension.

After projecting the image into 2-dimensions at step 25, it is necessary to identify the difference between front faces of polygons and back faces of polygons so that the back faces may be removed, given that they cannot actually be seen because they are obscured by a front face. Thus, at this stage, vertices are defined in 2-dimensions identifying the front faces of visible polygons.

At step 27, the 2-dimensional data relating to polygon position is scan converted to produce coloured pixels, taking into account data defining the colour of each polygon, as previously calculated.

At step 28, the pixels are written to the frame buffer on a polygon-by-polygon basis, thereby building up a complete 2-dimensional image. It should be noted that images must be written to the frame buffer at a rate of between ten to fifteen frames per second in order that a viewer will feel that the system is responding in an interactive way to input commands.

Figure 4:
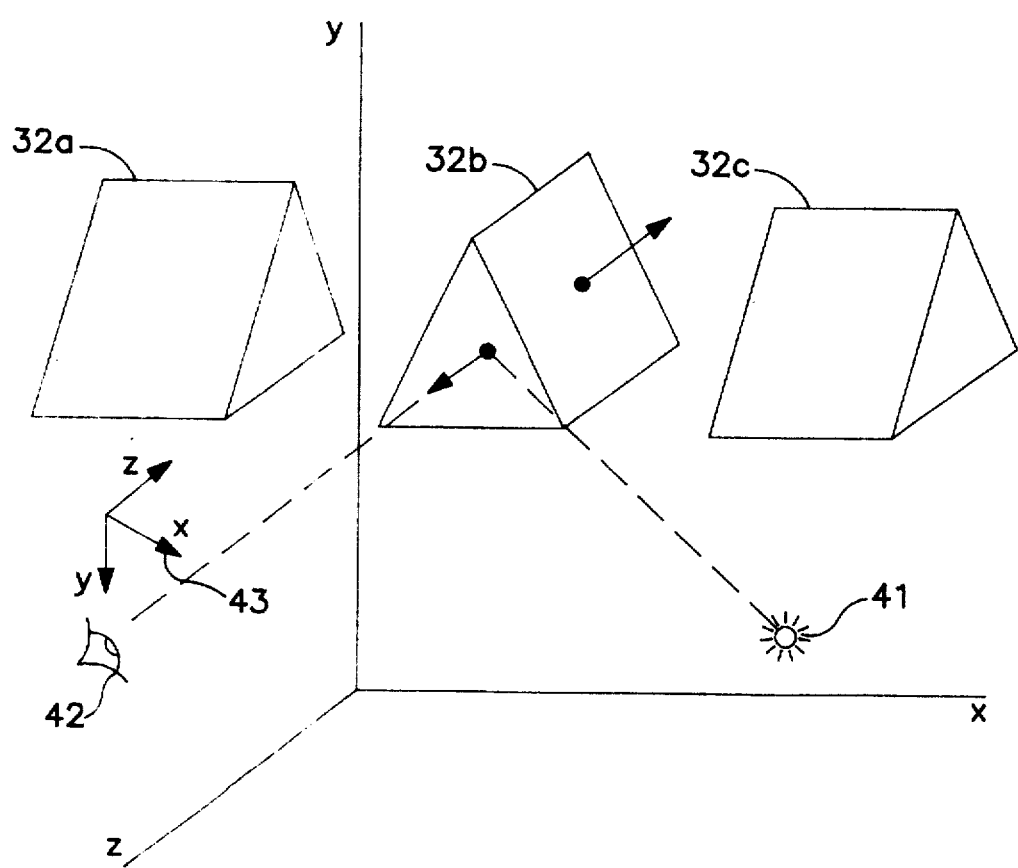
FIG. 4 represents an object repeatedly transformed into modelling space, including a light source and a viewing position.

A representation of modelling space is shown in FIG. 4. World coordinate axes X, Y and Z have a similar orientation to the axes provided in object space; as shown in FIG. 3, but may be scaled differently. For example, it may be appropriate, under default conditions, to define objects as being relatively large in object space and relatively smaller in modelling space, so that a plurality of objects may be assembled in modelling space.

In the example of modelling space illustrated in FIG. 4, the object illustrated in its own object space of FIG. 3, has been instantiated into the modelling space three times. Furthermore, some of the objects have been rotated, so that some normals 38 extend from the centre of polygon 32 are pointing in the positive z direction, whereas, in object space, they were pointing in the positive X direction.

Transformations from an object space, such as that illustrated in FIG. 3, to a modelling space, such as that illustrated in FIG. 4, are effected by matrix manipulation. Thus, the coordinate positions of, say, points 34, 35, 36 and 37 are multiplied by a transform matrix which replaces coordinates within the object space of FIG. 3 with coordinates of modelling space as in FIG. 4. Three instantiations of the object are placed into modelling space by using three different matrix transforms. Furthermore, additional objects may be placed into modelling space by effecting transformations upon other objects defined in their own object space.

Light sources may be introduced into the modelling space which, in addition to having position, also have orientation. Furthermore, parallel light may be introduced into the modelling space, representing the effect of light emanating from an infinitely displaced source, similar to light produced by the sun. The effect of each light source is considered in turn and lighting effects for each source are added together on a polygon-by-polygon basis.

In addition to the position of light sources, a viewing position 42 is also selected, illustrated by an eye symbol. The viewing position may, alternatively, be represented by a set of axes x, y, z 43, given that a transformation from modelling space as shown in FIG. 4, consists of transforming objects into a new space, 25 which has a different set of axes. In particular, whereas, in modelling space, the origin is at the back bottom left, in viewing space the origin is at the front bottom left or front top left. Thus, the z direction represents distances measured away from the viewing position.

As shown in FIG. 2, lighting calculations are made at step 22 before the viewing transformation is effected at step 23.

Lighting calculations for polygon 32b will be considered, with reference to FIG. 5. The lighting calculation produces an illumination factor I which, in a colour system, consists of colour components RGB.

The value I (RGB) representing the total illumination factor for the polygon, consists of an illumination factor I(a) from ambient lighting, a component I(d) from diffuse lighting from a light source and a component I(s) for specular lighting from said light source. I(a) is derived from the background ambient lighting B(a) and is obtained by multiplying this value by the ambient coefficient K(a), as shown in FIG. 5.

I(d) and I(s) are dependent upon the position and intensity of the light source 41 and, in accordance with the Phong model, I(s) is dependent upon the position 42 of the observer. The Phong model is convenient in systems of this type, although other models are known.

In the model, the diffuse component I(d) is derived from the cosine of the angle theta between a vector pointing towards the light source 41 and a vector normal to the plane. Its value is calculated by the scalar or "dot" product of the unit normal vector N and a unit vector L pointing in the direction of the light source 41. Thus, the component I(d) is obtained by multiplying a value identifying the intensity of the light emitted by the light source 41 I(1) by the dot product of vectors N and L by the coefficient K(d).

In accordance with the Phong model, the intensity of specular highlights is dependent upon the position of the viewer 42. A unit vector H is calculated which is half way between the unit vector L and a unit vector E, directed towards the position of the viewer 42. The dot product is then formed between the unit normal vector N and the unit half way vector H. The model is arranged such that the specular highlight is large when vectors E and L form similar angles to the plane 36, 37, thus resulting in vectors N and H being coincident. Moving away from this position results in the intensity of the specular highlight decreasing rapidly. To represent this in the model, the dot product of the H and N is raised to a power, typically lying within the range 15 to 20 or higher. This value is then multiplied by the coefficient K(s) and the intensity value I(l).

As previously stated, the total intensity value for the polygon in RGB space is calculated by summing I(a) with I(d) and I(s).

Raising the dot product of H and L to a power is a computationally expensive process, therefore the inclusion of means for calculating specular high lights is a significant overhead and in many systems is not included. However, specular highlights add significantly to the realism of the object and allow distinctions to be made between shiny and matt surfaces.

The lighting calculations illustrated in FIG. 5 are repeated for each polygon at step 22 of FIG. 2. As previously stated, at step 23 a view transformation is made, taking account of the view position 42. It should be noted that, in response to interactive input, the view position 42 may be interactively modified, therefore in the same way in which local transformations and the lighting of surfaces are performed at the interactive rate, view transformation is also performed at the interactive rate.

Most view positions result in only part of the modelling space being viewed, therefore, essentially, a viewing transformation consists of defining the viewable space and shifting the axes.

Figure 6:
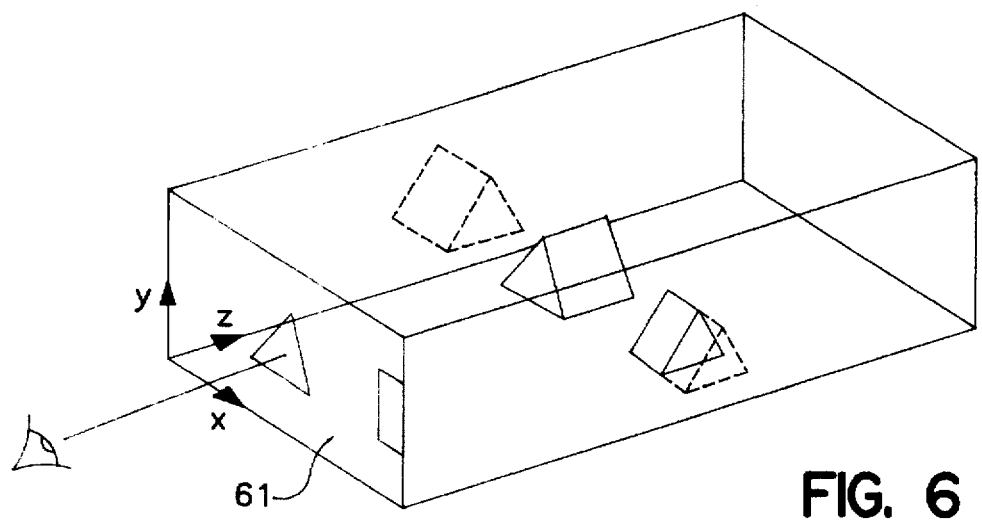
FIG. 6 shows a viewing space for an isometric projection.

A representation of a transformation of the modelling space, shown in FIG. 4, into isometric viewing space is shown in FIG. 6. As can be seen, each vertex is measured from the bottom left corner of a front viewing plane 61 and a viewer is positioned normal to the viewing plane in a minus z direction.

Figure 7:
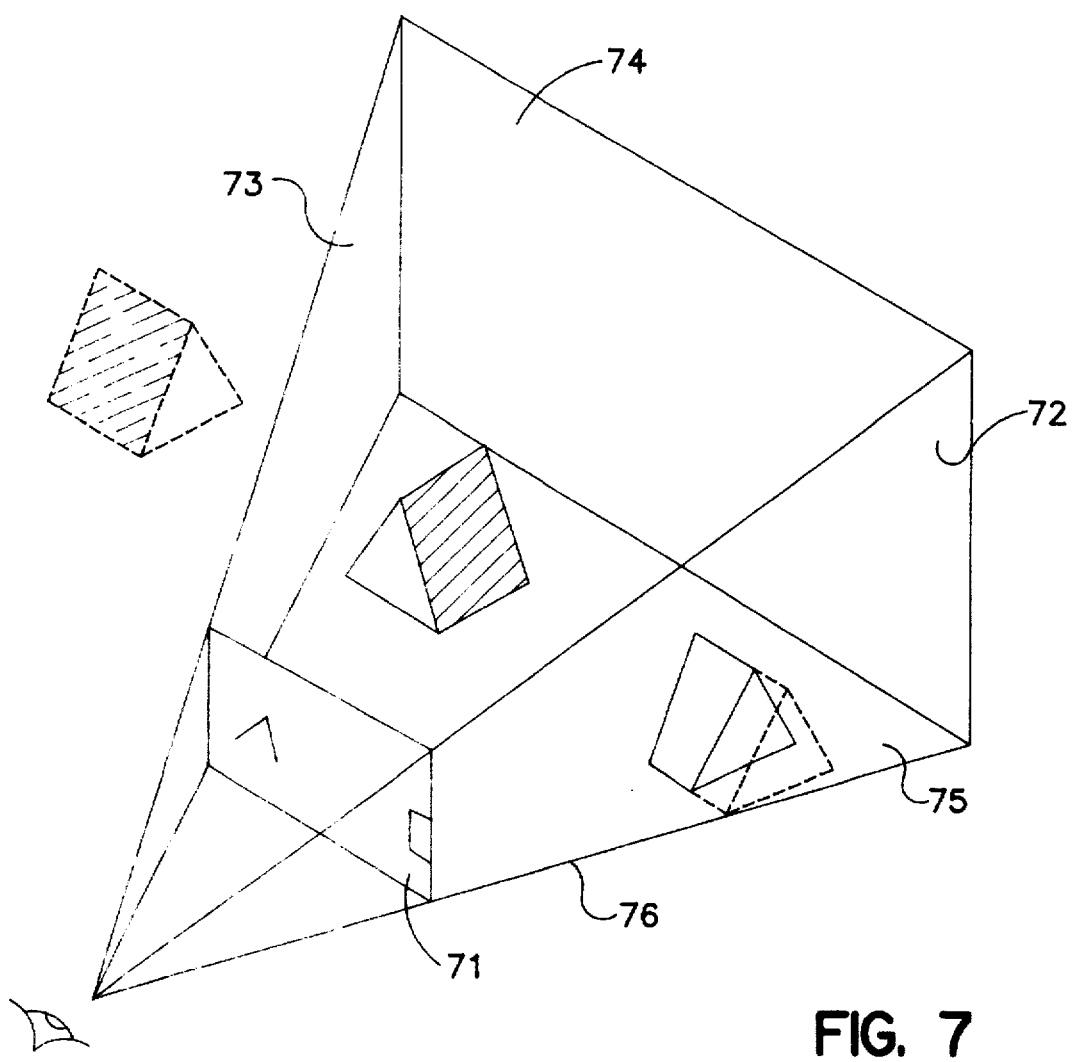
FIG. 7 shows a frustrum providing the first stage of a viewing transformation for perspective views.

A perspective view transformation may be considered in two stages. As shown in FIG. 7, the viewable portion of the modelling space is considered to be a frustrum, bounded by a front viewing plane 71, a back viewing plane 72 and sloping side planes 73, 74, 75 and 76. In order for the objects positioned within the frustrum to be maintained in their original shape, the space itself is effectively non-Cartesian, therefore further transformation is required, such that the viewing space itself can be represented in Cartesian coordinates. This results in a further transformation of the type illustrated in FIG. 8. Herein, the frustrum itself has been transformed into a parallelepiped, by transformation under which the extent of negative enlargement increases along the z axis. This results in negative enlargements being made to the objects within the space, such that edges that were parallel taper towards a vanishing point as they move in the positive z direction. Thus, data generated under an isometric transformation, of the type illustrated in FIG. 6, may now be processed in a similar manner to data generated under a perspective transformation of the type shown in FIG. 8.

Referring back to FIG. 2, after the 3-dimensional view transformation has been made, it is necessary to perform a clipping operation at step 24 such that polygons which are not included within the viewable space are rejected and do not undergo further processing.

Figure 8:
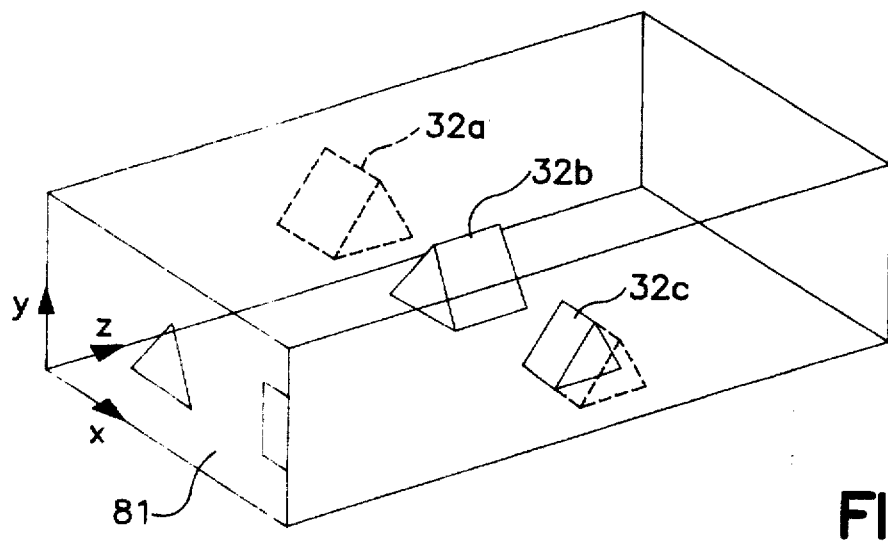
FIG. 8 shows a viewing space derived from the frustrum of FIG. 7 for generating perspective views.

Referring to FIG. 8, it can be seen that polygons will lie outside the viewable space. These polygons are identified by comparing their x, y and z coordinates with the coordinates of the viewable space, resulting in a list of polygons which will require further processing.

Referring to FIG. 2, the first stage of this further processing is to obtain a 2-dimensional projection of the 3-dimensional data by considering the image that would be seen at the front bounding plane 61/81.

Figure 9:
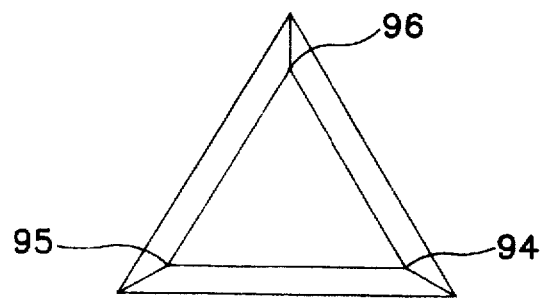
FIG. 9 illustrates a projection of polygons into 2-dimensions.

Considering the central object shown in FIG. 8, four polygons are visible from the viewing position as shown in FIG. 9.

Vertices 94, 95 and 96 represent the vertices of the back face of the object which, as shown in FIG. 8, has been reduced in size due to the perspective view transformation.

In addition, to transforming the vertices under the local and view transformations, the unit normal vectors are also transformed. Thus, the front polygon has a unit normal vector extending in the negative z direction of the view coordinates, while the back face has a normal vector extending in the positive z direction. Thus, at step 26 back face culling is performed by rejecting all polygons which have a unit normal vector with a positive z component.

It will be appreciated, therefore, that the unit normal vectors are used at both step 22 when calculating lighting and at step 26 when back face culling. Consequently, the unit vectors are transformed under the local transformation at step 21 and under the view transformation at step 23. Furthermore, these transformations will often produce normal vectors which are no longer of unit length. Consequently, it is necessary to re-normalise these vectors so that, in accordance with the coordinate system being used, they are re-established as normal vectors of unit length. Again, this is computationally expensive, given that square roots must be calculated for each polygon in order to calculate the x, y and z components of the transformed vector, having overall unit length.

Referring to FIG. 2, after the back faces have been culled, step 27 consists of scan converting the polygons to produce pixel values.

Figure 10:
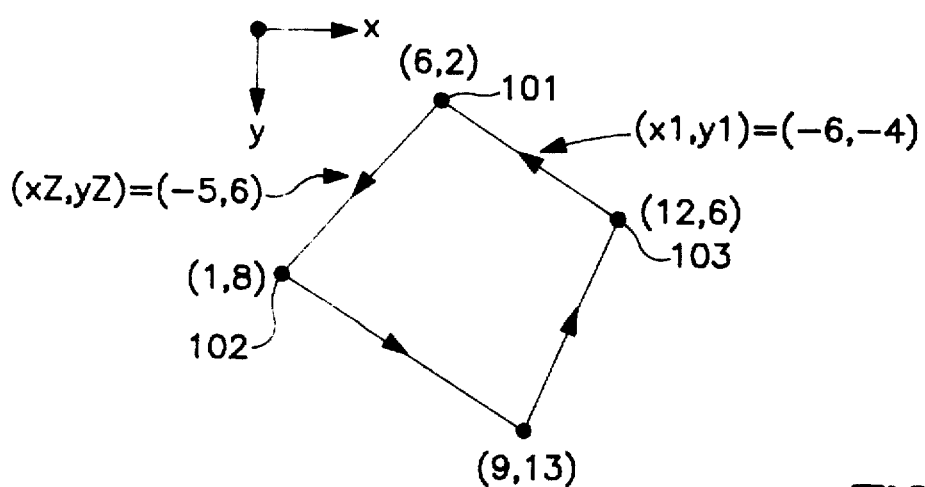
FIG. 10 illustrates a projected polygon for the purpose of scan conversion.

An irregular polygon is shown in FIG. 10 which has been projected into a 2-dimensional x-y plane. The polygon has not been culled because its front face is showing, therefore descending the list of data coordinates results in anticlockwise traversing around the polygon.

The x-y coordinates in the 2-dimensional projected plane define the positions of pixels within the frame buffer. Thus, the x and y coordinate positions typically lie over a range of 0 to 1,000 in both the x and y dimensions, from an origin at the top left corner.

Scan conversion is initiated by identifying which vertex of the polygon has the smallest y value, in this case, vertex 101. Thus, pixels within the polygon are filled-in starting from this point by calculating the gradients to vertices 102 and 103, which are located at positions (1, 8) and (12, 6) respectively. Thus, as known, it is possible to calculate which pixels within the polygon are to be painted with the polygon colour. This data is then written to the frame buffer at step 28.

Before data is written to the frame buffer, it is conventionally necessary to perform data truncation, given that the number of bits available within the frame buffer is limited, typically to eight bits per pixel location. Thus, a degree of colour aliasing must be tolerated, the extent of which being dependent upon the type of output being used.

DETAILED DESCRIPTION OF EXEMPLARY EMBODIMENTS

The processes previously described are successfully employed in interactive 3-dimensional graphics systems, in which 3-dimensional image data is modified in response to input commands and output 2-dimensional image data is generated at a rate sufficient to provide feedback to the operator, thereby completing the interactive environment.

The overriding problem with interactive 3-dimensional graphic systems is that of handling very large amounts of data. Each of the processes previously described can be implemented without difficulty and the computational requirements for performing any of the operations once is very modest. However, problems occur when the processing must be repeated many times.

Such a situation lends itself to processing within a hardware pipeline, in which a modest amount of processing is performed at each stage in the pipeline, whereafter the data is clocked to the next stage, resulting in a significant amount of parallel processing. Thus, the system shown in FIG. 2 may be implemented as a hardware pipeline in which each process 21 to 28 is performed by its own dedicated hardware elements.

The amount of data being processed tends to increase dramatically as it moves along the stages, particularly given that data which represents the positions of vertices defining a surface must be processed to form data representing the colour of all pixels within that surface. Thus, very large amounts of data are generated during step 28, during which pixel data is written to the frame buffer.

Hardware savings can be made by reducing, wherever possible, the level of data movement and data processing. It should be noted that, when a modest amount of processing is being performed on a large amount of data, even the modest process of moving data from one location to another or comparing a stored value with another value results in a significant overhead, if all of the data under consideration must be moved in this way.

By implementing economies, the object is to reduce the number of physical processors required to implement the necessary process steps. Each saving is significant and if a sufficient number of savings can be made, the whole process can be carried out on a common serial processor.

Figure 11:
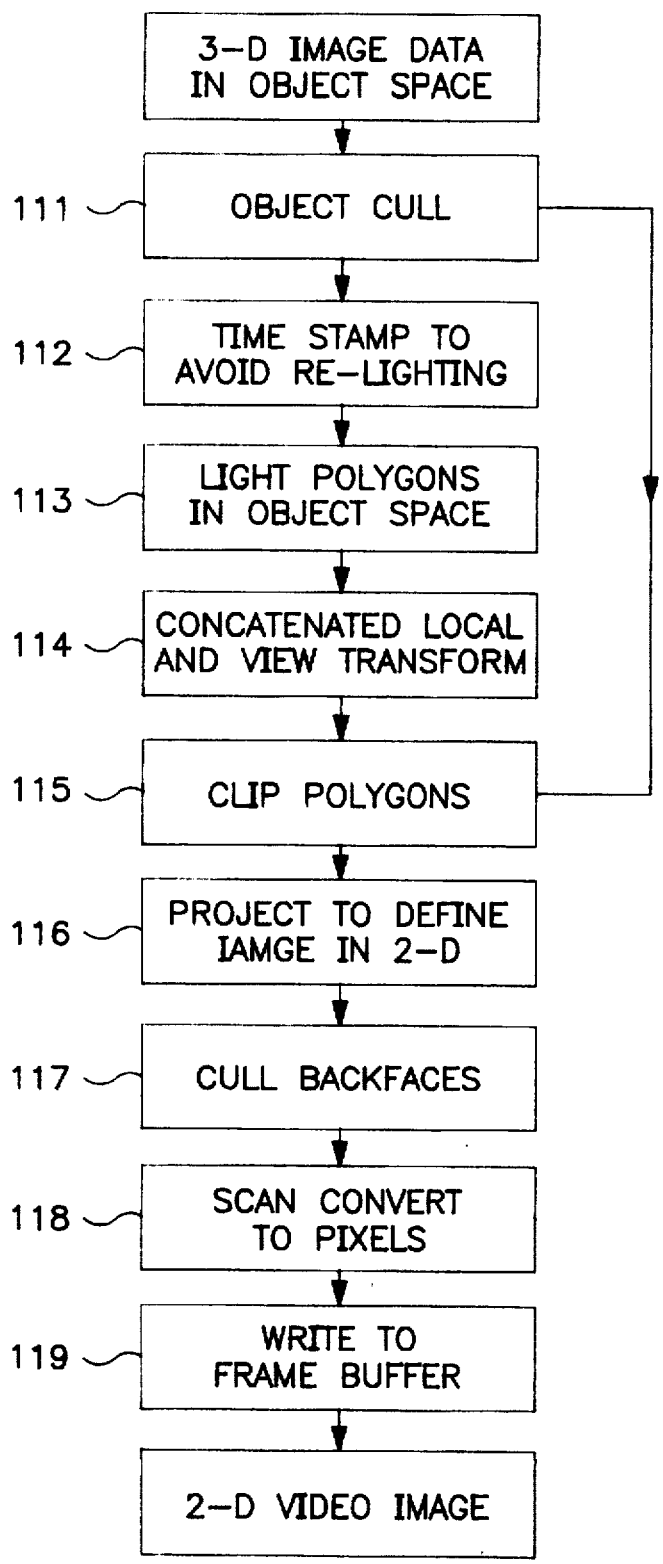
FIG. 11 illustrates a process facilitating interactive 3-dimensional graphics production and embodying the present invention.

The operational stages performed by apparatus for processing image data embodying the present invention is shown in FIG. 11. Comparing the system of FIG. 11 to the conventional system shown in FIG. 2, 3-dimensional image data defining object space is read at the start and 2-dimensional video image data is generated at the end, in both systems. However, significant differences exist in the way in which the data is processed, with an overall emphasis being placed on making economies in data transfer and data processing.

At step 111 object culling is performed by determining, after local transformation and viewing transformation, the extent to which an object can actually be seen. Extents are defined for the object in each dimension, that is to say, maximum and minimum values are determined for the object in each of the X, Y and Z dimensions. This process effectively defines a bounding volume in the form of a cuboidal bounding box of planes of constant X, Y or Z extent. Of course, other shapes of bounding volume may conveniently be employed. In particular, a bounding sphere can be defined very economically by reference only to the coordinates (X, Y, Z) of its centre and the magnitude of its radius.

It is not necessary to perform lighting upon the bounding box, therefore the local transformation and viewing transformation are performed as a common operation by concatenating the local and viewing matrices, thereby placing the object's bounding box within viewing space. Thereafter, the position of a transformed bounding box is considered, to determine whether it is totally within the viewable space, totally outside the viewable space or intersecting the viewable space.

If an object is totally outside the viewable space no further processing is performed on the polygons defining such an object, thereby making a significant saving in processing time. For objects totally within the viewing space, processing continues on these polygons and no saving is made, however, the processing overhead for transforming the bounding box is quite modest, at least in comparison with transforming an object comprising many polygons. For objects which are partially within the viewable space and partially outside the viewable space, data defining the planes of intersection are stored for reconsideration at step 115, involving the clipping of polygons.

In the process shown in FIG. 2, lighting calculations are performed for each iteration (each new image in the interactive sequence), irrespective of whether they are actually necessary. However, in the present embodiment a clock is present which effectively gives a unique time stamp to each iteration. This stamp is then applied each time lighting is moved and each time surfaces are moved. Thus, if on a present iteration, it can be seen that no changes have occurred to the position or orientation of the lighting or to the position of polygons from the last iteration, lighting calculations, calculated on the previous iteration, may be used again, thereby making a significant saving in processing time.

At step 113 the lighting of polygons, where necessary, is performed. In the system shown in FIG. 2, a local transformation is performed at step 21, surfaces are lit at step 22 and a view transformation is effected at step 23. As previously stated, the local transformation and the view transformation are mathematically similar and, when performed by matrix multiplication, the matrices defining the transformations may be concatenated into a common matrix. Thus, the local transformation and the viewing transformation are performed as one transformation from object space to viewing space, again significantly reducing the computational overhead.

Before the viewing transformation can be effected, it is necessary to perform lighting calculations. In the present embodiment, this is effected by calculating the inverse to the local transformation, effecting this inverse transformation upon the position of light sources, thereby effectively transforming the light sources into object space. Thereafter, lighting calculations are performed in object space and the object is transformed directly from object space to viewing space, using the concatenated matrix. Thus, the concatenated matrix used to transform the bounding box during the object cull, at step 111, is used again to transform the actual object polygons from object space into viewing space at step 114.

Step 115 is substantially similar to step 24 in FIG. 2 and involves the clipping of polygons which do not lie within the viewing space. However, as previously stated, additional information is generated at step 111 during the object culling process which identifies planes for viewing space through which objects intersect. This information facilitates the polygon clipping process at 115, thereby again reducing computational overhead to effect this part of the procedure.

The projection into a 2-dimensional image at step 116 is substantially similar to the projection process performed at step 25. At step 117 back face culling is performed, as required at step 26 of FIG. 2 but this procedure is performed without reference to the polygon normals, which are only used in the present embodiment within object space and are not transformed into other spaces, again reducing computational overheads. Thus, other methods must be provided to perform back face culling at step 117, as described later.

Step 118 provides scan conversion and computational overhead for this process is reduced by taking account of the restricted depth of most frame buffers, typically only having eight bits per pixel location. Thereafter, a 2-dimensional video image is produced in similar fashion to the system shown in FIG. 2 by raster scanning the frame buffer at video rate.

Aspects of the system shown in FIG. 11 which differs significantly from the procedure carried out in the system of FIG. 2 will now be described in detail.

OBJECT CULLING

Examples of the preferred embodiments in operation will be described with reference to an example similar to that described for the conventional system.

Figure 12:
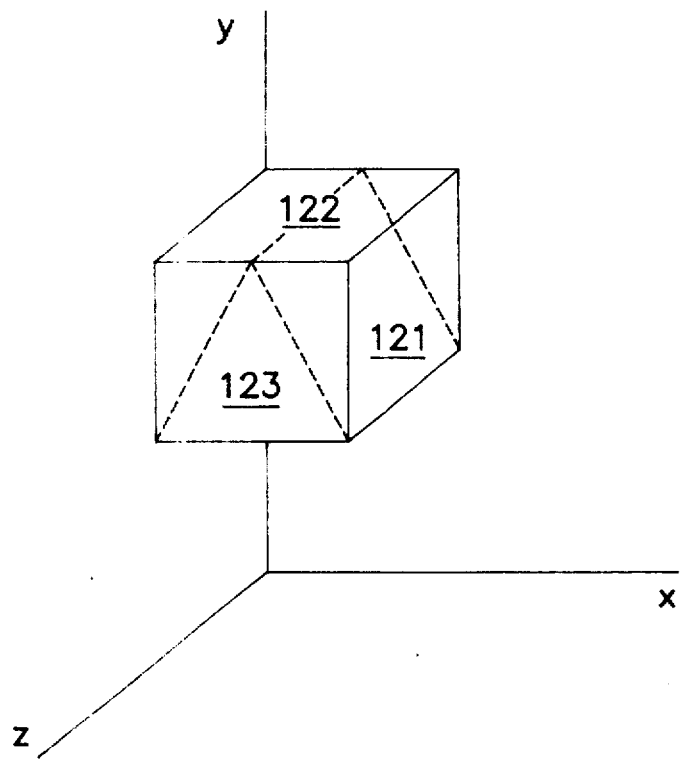
FIG. 12 illustrates a bounding box defining extents of an object defined in its own object space.

As previously described, an object is initially defined in its own object space, as shown in FIG. 3. Data stored in memory actually consists of a table of vertices defined with reference to the X, Y and Z coordinates. The object culling process at step 111 consists of examining X, Y and Z coordinates so as to identify the extent of the vertices for an object in each dimension, that is to say the maximum and minimum value in each dimension is determined. From these extents, a bounding volume in the form of a box is defined, as shown in FIG. 12. Thus, plane 121 represents the maximum extent in the X direction and the plane opposite plane 121 represents the minimum extent in X. Similarly, plane 122 represents the maximum extent in Y and plane 123 represents the maximum extent in Z.

In the example previously described, the polygons in object space were instantiated three times into modelling space and the three instantiations were then transformed to viewing space. In the present embodiment, objects are transformed directly from object space to viewing space and such a transformation is carried out on the bounding box shown in FIG. 12. Thus, when perspective views are being produced, the bounding boxes shown in FIG. 12, are transformed into viewing space as shown in FIG. 13.

Figure 13:
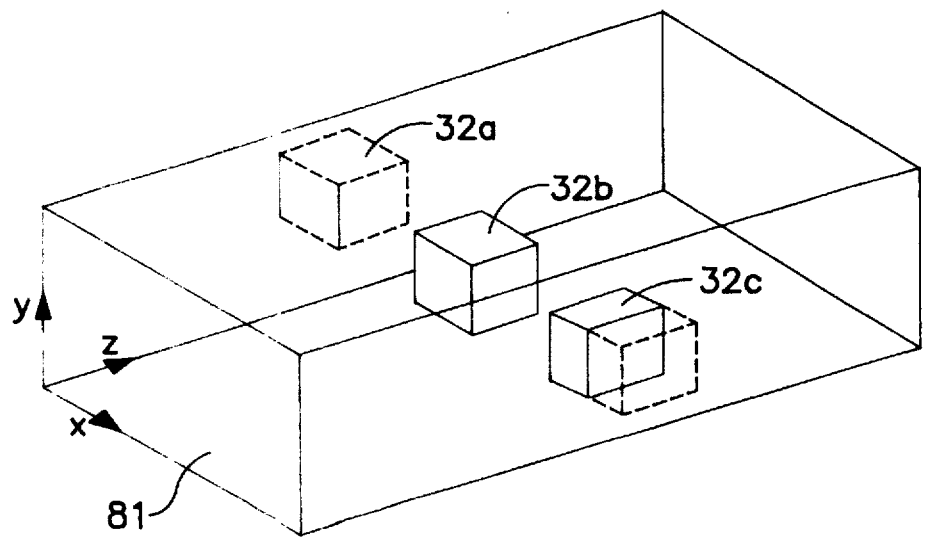
FIG. 13 illustrates the transformation of the bounding box shown in FIG. 12 into viewing space.

In FIG. 13, object 32b is completely within the viewable area. Object 32a is completely outside the viewable area and object 32c is partially inside and partially outside.

The polygons making up object 32b must be completely processed and no saving has been made. However, the polygons making up object 32a all exist within a bounding box which is outside the viewable space, therefore, on the particular iteration under consideration, all these polygons are effectively rejected and no further processing is performed on them.

The object 32c falls within a bounding box which is partially inside the viewing area and partially outside the viewing area. As far as this object is concerned, culling must be performed on a polygon basis. The fact that this object requires polygon culling is supplied to the polygon clipping process at step 115. Furthermore, information is also supplied to step 115 stating that the object intersects the plane X=+clip(X). Thus, when doing comparisons at the polygon clipping process, only clipping to the positive X direction needs to be performed, such that polygons which have X coordinates greater than clip(X) are rejected while polygons having X coordinates less than or equal to clip(X) are retained.

Thus, by performing the transform on the points defining the bounding box, it is possible to determine the extent to which said points are transformed into the viewing space and thereby reject, totally, any objects which fall outside the viewing space. Furthermore, it is possible, to facilitate subsequent polygon clipping of objects which are partially within the viewing space.

As noted above, although the embodiment described employs a cuboidal bounding box, any other bounding shape may be used. It should also be noted that it may not always be desirable to reject objects before transforming them into modelling space when they are outside the viewable portion of that space, for example because they are required to cast a shadow on other objects which are visible. The bounding volume test may still be useful to select objects for rejection before other aspects of further processing, however, for example to prevent effort being wasted to calculate lighting characteristics of the objects themselves.

TIME STAMPING TO AVOID LIGHTING CALCULATIONS

At step 112 changes are noted in light source parameters and changes are also noted in object positions. If a light source parameter and an object's orientation or position have not changed, it is not necessary to recalculate lighting characteristics for that particular object. Thus, lighting characteristics previously calculated are retained and used again.

Changes in lighting position, object position and object orientation are identified by applying a unique time stamp to each iteration of the process. Thus, if, in response to interactive operations, an object or a light source is modified, said objects or light source is restamped with the unique reference for that particular iteration. At step 112 the time stamps for these objects and lights are examined against their previous value for the previous iteration, thereby identifying a condition to the effect that a position or orientation has changed.

On identifying this condition, lighting characteristics are recalculated and no saving is made. However, if, say, one object is moved in a space containing a plurality of objects, only the polygons making up that particular object require lighting characteristics to be recalculated and a significant saving can be made for the particular iteration.

LIGHTING POLYGONS IN OBJECT SPACE a) Transforming Light Sources

In an interactive system, data is stored defining the position of light sources, a viewing position and an arrangement of polygons defining an object. In addition, a local transform defines how an object positioned in its own object space is transformed into viewable 3-dimensional space. This may be referred to as modelling space and the system is arranged such that the viewer is given the illusion of moving around within this modelling space.

In the present embodiment, the inverse of the local transform is calculated and this inverse transform is used to transform the position and/or orientation of light sources from modelling space and back into the object's own space. Thereafter, lighting characteristics of the non-transformed polygons, in their own object space, are determined in response to the transformed light source or light sources. Thereafter, the embodiment also transforms the object, lit in its own object space, under an operation which combines the local transform and the viewing transform, thus a significant saving is made, in that two transformations have been replaced by a common transformation.

Furthermore, as described with reference to FIG. 5, it is necessary to consider the unit normal vector of each polygon when calculating lighting characteristics. In the present embodiment, the normal vector for each polygon is available within its own object space and the calculation using this unit vector is performed within object space. Thus, once lighting characteristics have been calculated, no further use of the unit normal vector is required and said vector is not transformed, thereby saving computational power.

A transformation of the unit normal vectors into modelling space usually results in said vectors no longer being of unit length. Consequently it would be necessary to re-normalize said vectors, which represents a significant computational overhead. By performing the lighting calculations in object space, where the normal vectors are available, said normal vectors do not need to be transformed into modelling space for the purpose of calculating lighting.

Thus, the overhead of performing this transformation is lost along with the even greater overhead of performing the re-normalisation process. As will be described below, the present embodiment also permits culling of back facing polygons after projection into viewing space, but without the need for projected surface normal vectors.

Figures 14, 15:
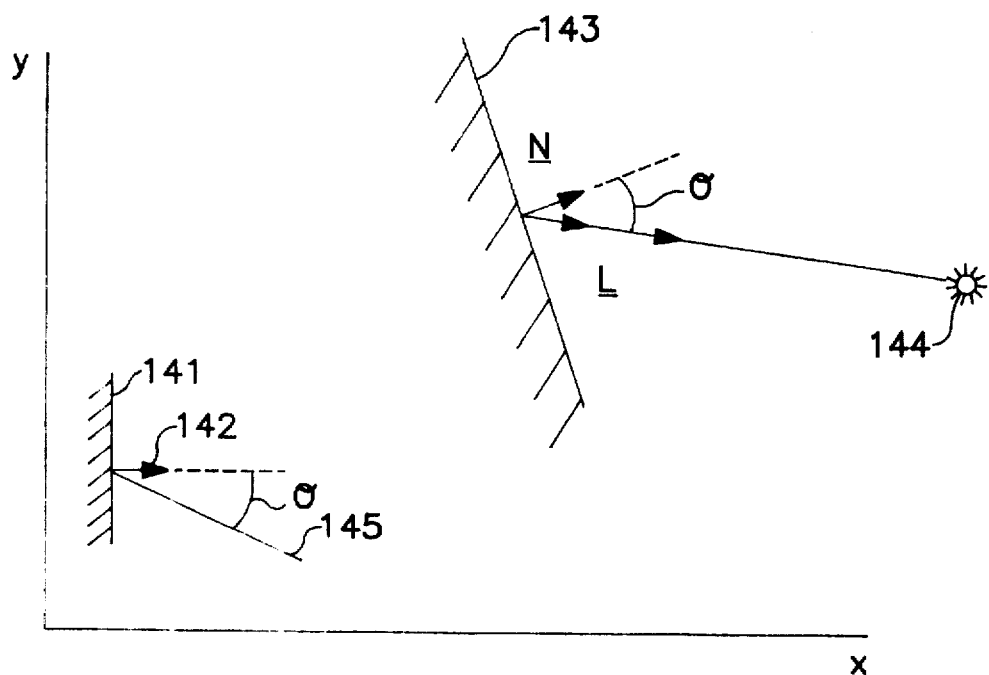
FIG. 14 illustrates the calculation of lighting characteristics in the process of FIG. 11.
FIG. 15 illustrates algorithms used for calculating diffuse and specular reflections in the process of FIG. 11.

FIG. 14 shows a 2-dimensional representation of object space axes X and Y, with similar modelling space axes overlaid. A polygon 141 is shown, which represents the position of the polygon in its own object space. Data is stored representing the position of vertices in object space, along with data representing the polygon's unit normal vector 142.

Under the operation of a local transform, transforming the polygon 141 into modelling space, a polygon 143 is generated in modelling space. It should be noted that the local transform affecting this transformation consists of a translation in the positive X and Y directions, an enlargement by factor 2 and an anticlockwise rotation.

In modelling space, a light source 144 is present and the lighting characteristic of the polygon 143 would have been calculated with reference to the unit normal vector N and the unit light vector L. The unit vector N would be obtained by transforming unit vector 142, which produces a vector having a length greater than unity. Consequently, it would have been necessary to perform a process of re-normalization, in order to calculate the true normal unit vector N.

In the present embodiment, lighting calculations are not performed with reference to a transformed polygon 143, therefore, there is no need to transform unit normal vector 142. As previously stated, the inverse transform to the local transform is calculated and this inverse transform is used to effect a transformation of the light source 144 to position 145 within object space. Thus, the relationship between the inversely transformed light source 145 and the non-transformed polygon 141 is equivalent to the relationship between the transformed polygon 143 and the non-transformed light source 144.

The unit vector L is calculated within object space and lighting characteristics are calculated from the dot product of N and L. If required, other lighting characteristics such as specular lighting could also be calculated within object space. If required, inverse transformations could also be performed on the viewing position, thereby bringing the viewing position into object space. Thus, Phong model specular lighting could be calculated within object space. However, such lighting effects are not calculated according to the Phong model in the present embodiment, as detailed later.

Thus, as previously stated, significant computational savings are made by effecting the inverse local transformation upon the light source rather than transforming the polygons into modelling space, so as to calculate lighting characteristics. The need to transform the unit normal vector into modelling space is avoided and a local transform and a viewing transform may be concatenated, so that only one operation is required to transform polygons from object space directly into viewing space.

b) Specular Highlights Listing

As described with reference to FIG. 5, the calculation of lighting characteristics created by specular highlights is computationally demanding because values are usually raised to a power, so as to represent the way in which specular highlights rapidly fall off as movement is made from the position of highest intensity.

In the majority of applications, objects usually have few specular highlights, although such highlights add significantly to the quality of the final image. Some polygons may have many small specular reflections but very little impairment to the quality of the image results if such small insignificant highlights are ignored. Thus, for many objects, not all polygons have significant levels of specular reflection. In most cases, the majority of polygons will not have significant levels of specular reflection. In the present embodiment, polygons which have significant levels of specular reflection are grouped separately from those which do not, and are processed in accordance with a first algorithm, while the other polygons are processed in accordance with a second algorithm.

In the embodiment, the polygon data is arranged in a list so that polygons having a significant level of specular reflection are grouped together, such that all polygons requiring the first (expensive) algorithm are processed together and all polygons requiring the second (less expensive) algorithm are also processed together. By organising the polygons in this way, an algorithm or process for calculating specular reflections is only employed for polygons which have a significant amount of specular reflection thereon. As used herein, specular reflection relates to all types of reflection which requires a significant amount of processing of this type and thus may be separated from polygons which require only linear calculations for their lighting characteristics, predominantly diffuse lighting characteristics, to be calculated.

Particular savings arise by this means when generating a sequence of images interactively, or to record a motion picture sequence. Whereas known systems test each polygon every time it is rendered to determine whether the expensive specular reflection calculation is required, the present embodiment needs to perform this test only once for each polygon, for so long as its specular reflection characteristics remain unchanged. It will be appreciated that the surface reflection characteristics of objects are not normally required to change in the course of an interactive sequence.

Therefore, for each polygon and each iteration, the present embodiment avoids a memory access which would conventionally be required to read the specular reflection coefficient of the polygon and a comparison operation for determining whether the level of specular reflection is significant. Those skilled in the art will appreciate that, when a large number of polygons are to be reproduced at an interactive rate, eliminating a memory access and a comparison operation can lead to a significant reduction in computational overhead.

It should be noted that there is not conflict between the grouping of polygons according to their specular reflection characteristics does not conflict with any requirement that polygons are sorted into depth order for hidden surface removal, as will often be required. The polygon data itself is not physically moved in order to perform the ordering. Rather, lists of references to the individual polygons are kept, and a separate list can be kept for the purposes of writing calculations and hidden surface removal.

c) Highlight Value Calculation

The Phong model for calculating specular reflection is detailed in FIG. 5 and, as shown; it is necessary to calculate the dot product of the unit normal vector N with a unit vector H positioned half way between the vector L, directed towards the light source 41, and a vector E, directed towards the viewing position 42. Thus, implementing the Phong model is computationally expensive, given that the H vector must be calculated and the dot product of H with N must then be raised to a power.

In the present embodiment, lighting calculations are performed within object space, as previously described, therefore calculation of the H vector involves transforming the viewing position into object space and then performing additional calculations in order to determine the position of said vector.

Strictly speaking, specular highlights refer to highlights which are dependent upon the viewing position. Thus, in the Phong model, as the viewing position is changed, the position of the specular highlights also changes, the nature of such highlights being such that they have a relatively high intensity when the viewing position is aligned with the reflection of the light source, while the intensity diminishes rapidly at other orientations.

Specular highlights significantly increase the quality of the final image by giving it a sense of realism. However, as a result of experimentation, it has been established that it is the non-linear property of these highlights, the fact that they taper off very rapidly from a high intensity peak, that is the major factor in creating the effect. Furthermore, colours tend to de-saturate towards the colour of the light source. Thus, an observer is often aware of the highlights as a feature of the object itself and not as a feature of the relationship between the viewing position and the light source.

The present embodiment makes use of this observation, in that lighting characteristics are calculated in response to lighting parameters of surfaces and the parameters of light sources, without making reference to the viewing position. Thus, a lighting parameter is non-linearly processed to simulate highlight characteristics, without reference to the view position.

In the embodiment, the H vector is not calculated and a specular highlight is simulated by considering the dot product of N with L, as required for calculating diffuse characteristics.

To simulate the non-linear nature of such highlights, the specular characteristic is calculated by raising the dot product of N with L to a power n, in which n represents the specularity or shinyness, of the polygon under consideration.

After calculating the non-linear term, said term is multiplied by the specular coefficient K(s) and a factor representing the intensity of the light source I(l).

As previously stated, in the embodiment, the specular calculation is only performed for polygons having a significant specular component. Thus, when K(s) falls below a particular threshold it is not necessary to perform the specular calculations.

d) Calculating Accuracy

Referring to FIG. 4, illustrating objects 32a, 32b and 32c, light source 41 and a viewing position 42 in modelling space, the positions of objects within this space are calculated to a high level of accuracy, using floating point arithmetic. A high level of accuracy is required because, given that many manipulations are performed, quantising errors would build up and could produce noticeable effects in the output image. Furthermore, the use of floating point arithmetic allows objects to be scaled over very large ranges, such that a polygon forming part of an image may be viewed at one extreme (taking up substantially the whole of the viewing field) and at another extreme, being hardly visible within a very small object.

In conventional systems, as previously described; all calculations are performed using floating point arithmetic of this type, including lighting calculations. However, although a very high level of accuracy may be provided for calculating lighting, most of this accuracy is truncated as data is supplied to the frame buffer 19, given that said frame buffer will have a limited depth, typically of eight bits per pixel location. Other systems are known in which all calculations are performed in fixed point arithmetic, but with a very large number of bits for high accuracy. These systems are generally inconvenient because of the finite world size and restricted scope for scaling etc.

In the present embodiment, as previously stated, means are provided for calculating the position of objects in space in high accuracy floating point arithmetic. However, lighting characteristics are calculated using lower accuracy fixed point arithmetic. The limitations of fixed point arithmetic are tolerated because results are still produced which are more accurate than the accuracy of values supplied to the frame buffer, therefore truncation is still required. However, the rate at which fixed point arithmetic may be performed is substantially higher than the rate of performing floating point arithmetic, thereby reducing computational demands.

In the embodiment, the fixed-point arithmetic is performed using 32 bits, of which 16 bits are allocated to whole numbers and 16 bits are allocated to fractions. The type of arithmetic employed is often referred to as integer arithmetic although, as will be appreciated, values perceived as integers by the arithmetic unit may actually represent fractions as previously described.

In the present embodiment, all matrix and position calculations are carried out in floating point arithmetic. Thus the position of a polygon's vertices, the location of the light sources within a world and the matrix containing the local transform are calculated in floating point arithmetic. The translation from floating point to fixed point takes place at only two places, as will now be described.

In a pre-calculation phase, the first point at which conversion from floating point to fixed point is required is when the normal to the polygon (or vertex) is pre-calculated. Here the algorithm is straightforward: carry out all calculations in floating point until the final values are ready for storage, then (and only then) convert the values to fixed point numbers. In some embodiments this will impose a restriction upon the coordinate system of the 3d world thus handled, in that no coordinate can exceed the largest number representable in the chosen fixed point numeric range.

Secondly, when lighting must be recalculated, the inverse transform of the light vector (lighting direction), with respect to the local transform of the object, is calculated in floating point to produce a floating point 3-vector. For a point or conical light source (that is, one not positioned at infinity) the inverse transformed position of the light is also calculated (also using floating point arithmetic). Then the inverse transformed direction vector is converted from floating point to fixed point. Likewise the position, for point and conical lights.

The normal to the polygon (in the case of facet shading) or the normal to the vertex (in the case of vertex shading) has been precalculated in fixed point, and this is combined with the converted lighting vector in the traditional way to produce a fixed point coefficient of illumination. In the case of facet shading the coefficient of illumination is converted into a colour value (palette index or RGB triple) and stored as the colour of the polygon. In the case of vertex shading the illumination coefficient for the vertex is stored, as an integer. Interpolation to obtain per-pixel colour values can then be performed in fixed point or integer arithmetic, to achieve a significant saving. In both cases the only final stage conversion required is that of fixed point number to integer, a relatively trivial operation.

CULLING 2-DIMENSIONAL BACK FACES

In the conventional system, as previously described, back face culling is necessary once an image has been projected into 2-dimensions, that is to say, data representing points in 3-dimensions are converted to data representing the points in 2-dimensions.

In 2-dimensions, a plurality of polygons may be present at the same location. However, polygons which represent a back face are not actually visible and therefore said polygons must be culled from further processing.

In the conventional system, data representing the unit normal vector for each polygon also undergoes transformations. As previously stated, a transformation from object space into modelling space of unit normal vectors is necessary in the conventional system because this vector is used for calculating lighting characteristics. However, in the present embodiment, given that lights are back transformed into object space; it is not necessary to transform the unit normal vectors for the purpose of lighting. Therefore these vectors are not already available as data representing points in viewing space, nor are they available prior to projecting polygons into 2-dimensions.

In the present embodiment, it is still necessary to determine whether 2-dimensional polygons are forward facing or back facing, so as to effect culling of the back facing polygons. In the present embodiment, projected vectors defining the polygon edges are processed in viewing space so as to determine whether a polygon is forward facing or back facing.

The vectors compared must share a common vertex, therefore a common vertex is selected. As described with reference to FIG. 10, the process of scan conversion involves selecting the vertex 101 which has the minimum y coordinate, that is to say, it is the vertex which is closest to the top of the viewing screen. As part of the scanning process, and as previously described, it is necessary to calculate the gradient of the vector connecting points 101 and 102, and to calculate the gradient of the vector connecting point 101 to 103. In the table of data, due to anticlockwise ordering convention, point 103 will be listed prior to point 101, which in turn will be listed prior to point 102. Thus, for a forward facing polygon, irrespective of its transformation within 3-dimensional space, the vector connecting point 101 to point 102 should always be to the left of the vector connecting point 101 to point 103, when the polygon is front facing.

Thus, the gradient, that is to say the rate at which x changes with y, will always be greater (more positive) for the vector connecting vertex 101 to vertex 103 than the similar gradient for the vector connecting vertex 101 to vertex 102, when the polygon is front facing. Thus; if the gradient of the vector connecting the highest (minimum y value) vertex to its preceding vertex is less than or equal to the gradient connecting said highest vertex to its succeeding vertex, the polygon is to be culled. This is because it is either back facing or it is on edge, neither of which should be rendered.

As a numerical example, the coordinates (6, 2) (1, 8) and (12, 6) are shown in FIG. 10 as the x, y positions of the vertices 101, 102 and 103. Starting at vertex 101, the vector connecting vertex 101 to vertex 102 represents a decrease of 5 in the value of x, for an increase of 6 in the value of y. This corresponds to a gradient of −5/6. The vector connecting vertex 101 to vertex 103, on the other hand, represents an increase of 6 in the value of x, for an increase of 4 in the value of y. This translates to a gradient of —6/—4 or 3/2. This is greater than the other gradient −5/6, confirming that the polygon is forward facing.

It may be noted that the gradients thus calculated are not wasted, in that they are useful for the operation of scan conversion, to be described below. Moreover, where a vector forms an edge between two polygons to be considered, the calculated gradient can be stored and used for both polygons. Note also that the trivial case of FIG. 10 can be confirmed as a front facing polygon without calculating the gradients, by observing that from vertex 101 to vertex 103 the value of x decreases, while from vertex 101 to vertex 103 the value of x increases. This confirms that one gradient is less than zero while the other is greater than zero, such that the one must be greater than the other. Only when both gradients are of the same sign is it necessary to perform the division and calculate the gradient. On the other hand, in an embodiment where the gradients are anyhow required for scan conversion, this pre-test on the basis of signs alone will not save any computation.

As an alternative to comparing gradients, in an alternative embodiment, z component of the vector or "cross" product of vectors connecting points 103 to 101 and 101 to 102 is calculated. Such an approach is similar to transforming the normal vectors, as previously performed. However, the magnitude of the vector is irrelevant and only its direction in the z dimension is required, thereby making the calculation less intense than that required for re-normalization.

Thus, a partial cross product is calculated to identify the z component of a normal vector in screen space and the polygon is culled if the vector calculated in this way points into the screen. Using again the example of FIG. 10, the first vector has components (−6, −4) and the second vector has components (−5, 6), in accordance with the ordering of the vertices 103, 101, 102. Representing these as (x1, y1) and (x2, y2) respectively, the z component of the cross product is defined as x1y2−x2y1. In the present example this results in −36−20, which equals −56. Since this is a negative z value, pointing out of the screen, the polygon is front facing.

Note again that in many cases the multiplication of the vector components becomes unnecessary, if initial tests are performed on the signs of the four components. For example, if x1 and y2 are both positive or both negative, and if x2 and y1 are of opposite sign, the resulting z component will always be a positive value. Only in cases where the two terms x1y2 and x2y1 are of the same sign is it necessary actually to perform the multiplication and subtraction operation to determine the sign of the cross product.

It may also be noted that, compared with problems often encountered in known systems, the back facing test based on the projected vectors employed in the present embodiment automatically takes into account perspective effects included in the viewing transformation. Referring for example to the object 32b in FIGS. 8 and 9, the side faces of the object are clearly identified as back facing in the viewing space, whereas in the modelling space without perspective correction (FIG. 6) these faces are parallel to the viewing direction.

SCAN CONVERSION

Referring to FIG. 11, at step 116 the 3-dimensional view is projected to define an image in 2-dimensions, wherein each vertex is given a 2-dimensional coordinate position. At step 117 back face culling is performed as previously described so that, at any position on the screen, only one polygon is present, thereby uniquely defining the characteristics of that position.

Step 118 consists of scan conversion, which involves specifying which pixels are required to be modified to define a particular polygon and, additionally, to specify a colour for those particular pixels.

In the preferred embodiments, the process for identifying which particular pixels are to be included within a polygon is substantially similar to the process employed in the conventional system and as described with reference to FIG. 10. The process is also described in the applicants co-pending European Patent Application EP-A-0531157

(not published at the present priority date) included herein by reference as part of the present disclosure.

As previously described, it is necessary to determine gradients, specifying how x varies, that is the span across each line, as y varies on a scan line by scan line basis. Thus, gradients, conventionally referred to as variations of y with respect to x are, in accordance with the present convention, referring to variations in x with respect to y. Thus, as previously stated, as y is incremented, identifying descending scan lines, it is possible to identify pixel locations within the polygon which require colour modification.

In the present embodiments, each pixel location within the frame buffer 19 stores eight bits and, as previously stated, in the present embodiments, lighting characteristics are calculated using fixed point arithmetic, although these fixed point values will still require further truncation before being written to the frame buffer 19. In the embodiments, 2-dimensional image data is produced, wherein pixels in 2-dimensional areas are coloured in response to calculated lighting characteristics, representing the colour of said areas. Pixel colours are stored in a look-up table, which is addressed by values read from the frame buffer.

In a first embodiment, values stored in the frame buffer have a predetermined number of bits representing colour hue and a predetermined number of bits representing another characteristic of the selected colour.

In this first type of embodiment, the eight bit addresses to the look-up table, sequentially read from the frame buffer, are arranged such that three bits identify hue and the remaining five bits represent another characteristic of the selected hue. Thus, with three bits available, a total of eight hues may be provided, selected from the gamut of colours which may be realised by the VDU 18. Thus, for example, hues such as blue, red, green, magenta, cyan and yellow may be selected and the system may be considered as having a separate five bit look-up table for each of said selectable hues.

Various colour ramps are possible, according to the wishes of the system designer or user. In one example, within each of said five bit look-up tables, the other is characteristic which varies is luminance, which varies linearly. This arrangement, previously known in principle, is shown graphically in FIG. 16. Three bits of a value read from the look-up table represent colour, therefore one of the colours C1 to C8 is selected.

The remaining five bits define one of 32 luminance levels. Thus, linear interpolation between colours is not possible and colour aliasing occurs. However, luminance is controllable over a 32 bit range, which produces results of acceptable quality, given that the eye is more sensitive to luminance aliasing.

Figure 16:
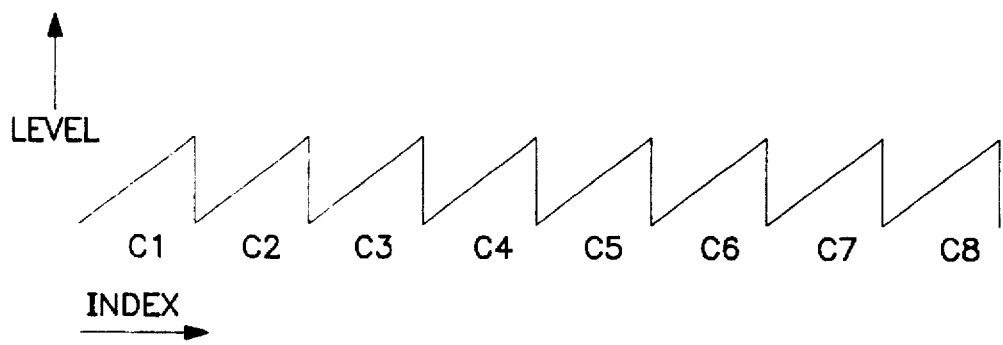
FIG. 16 illustrates a colour look up table for converting eight bit colour values into full colour values for display on a visual display unit, including a plurality of colour ramps.
Figure 17:
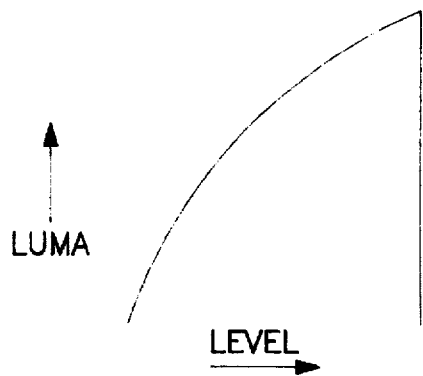
FIG. 17 illustrates an alternative colour ramp with gamma correction for luminance values.

A colour ramp for an alternative example is shown in FIG. 17. It should be noted that this colour ramp is repeated eight times, in a similar fashion to FIG. 16, once for each selectable colour.

In FIG. 17, luminance is varied in response to the additional five bits but the variation of luminance with values read from the frame buffer 19 is non-linear to provide gamma correction, thereby allowing look-up tables for colour conversion and gamma correction to be combined into a common look-up table. This too is previously known in principle.

Figure 18:
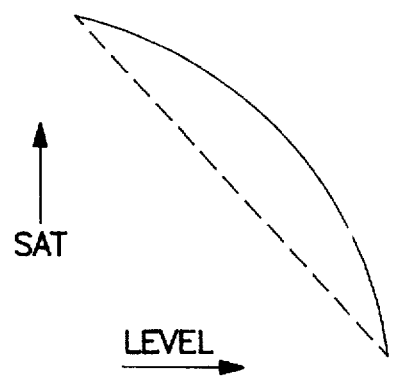
FIG. 18 illustrates an alternatively shaped colour ramp with non-linear saturation values.

Another alternative colour ramp is shown in FIG. 18 which again would be repeated eight times as shown in FIG. 16. In FIG. 18, the other characteristic of a selected colour is saturation. Thus the colour ramp may initiate at a fully saturated colour value, with a predetermined amount of luminance and, as input values increase, the saturation decreases, so that the output colour fades from a distinct colour towards white.

The purpose of the colour mapping shown in FIG. 18 is to simulate the effect of specular highlights which appear substantially white (assuming white light sources), even on coloured objects. Again, this response is made non-linear which may facilitate the calculation of specular highlight non-linearities. Thus, as previously described, specular highlights may be calculated by raising the dot product of N and L to a power. In the present alternative embodiment, it may only be necessary to calculate the dot product without raising it to a power, because the non-linear raising to a power may be performed by the look-up table, when pixel values stored in the frame buffer are converted to real colour signals.

Alternatively, a specular highlight process may perform easily implemented power raising (to the power 16 say) with further non-linearity being introduced by the look-up table.

Figure 19:
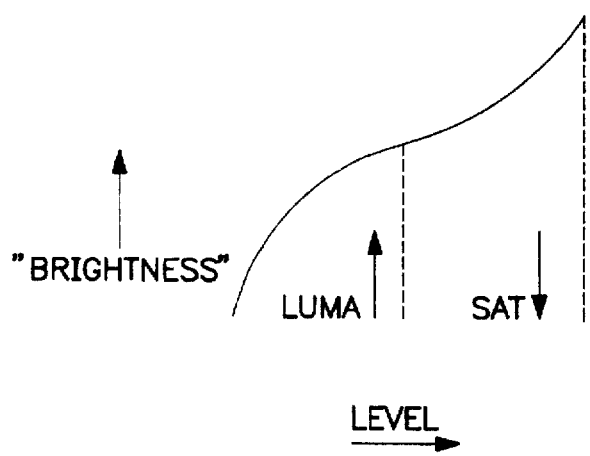
FIG. 19 illustrates schematically an alternative colour ramp combining non-linear luminance and saturation values.

A yet further alternative embodiment for the colour ramps is shown in FIG. 19, which combines the luminance characteristic of FIG. 17 with the saturation characteristic of FIG. 18. As previously described, three bits select one of the eight available hues. The remaining five bits represent the level of lighting applied to the surface. Initially, luminance values start at zero and the object is represented as black. As the lighting value increases, the luminance value increases and saturation remains high, such that a red area, say, gets brighter but remains red, representing the effect of diffuse reflection, until at about half way, or preferably further, luminance reaches its maximum value.

As the lighting level increases, it is assumed that this increase is due to specular reflection. Thus high input values result in a decrease in saturation, so that a red highlight changes to white. Thus, each ramp undergoes a change from black to full colour to white, wherein a different colour is provided for each ramp.

As shown, the luminance region varies non-linearly take account of gamma correction and the saturation region varies non-linearly to represent specular reflection. Alternatively, either or both of these ramps could be linear.

FIG. 20 illustrates separately the green (G) blue (B) and red (R) components stored in the colour look-up table for one of the colour ramps. In particular the colour ramp illustrated in FIG. 20 corresponds to the colour cyan, which is chiefly composed of green and blue components, with little or no red. As shown along the horizontal axis in the three graphs, an increase in the look-up table index over the range of the cyan colour ramp causes a change from a black colour at K, through increasingly luminous cyan shades to a maximum luminance of cyan shade at C, followed by a decrease in saturation accompanied by a continuing increase in perceived brightness, reaching bright white at point W.

This is achieved in that, from point K to point C; both the green and blue components rise strongly to a high, but not maximum, value, while the red component rises only slightly. Thus at C, large and equal proportions of green and blue are mixed with a small proportion of red, to achieve the desired high intensity, saturated cyan colour. Thereafter in the portion of the range from C to W, the red component rises exponentionally, while the green and blue components also rise noticeably to a maximum value. Thus the colour desaturates towards white, and the perceived brightness of the colour continues to increase.

In many systems, the full range of colour look-up table values will not be available, for example because the operating system requires certain colour values to be permanently assigned. In an embodiment operating under Microsoft Windows (™), for example, it will often be the case that the first ten or so values in the colour look-up table are permanently assigned for the display of borders, menus, and other messages. In such cases, it may be preferred to divide the available range of index values into sub-ranges which are not exactly powers of 2 in size. For example, 8 sub-ranges of 28 values each can be provided occupying 224 entries in the look-up table, leaving 22 entries for system purposes. In such an embodiment, rather than having separate bit fields for the colour hue selection and the brightness level index, and simply concatenating these to generate the final table index, it will be preferable to store a base index for each hue, and add to this a level value in the appropriate range in order to address individual shades within a sub-range of the look-up table. There is little loss of performance associated with this change, in that most processors can perform an add operation at the same speed as an OR operation.

For example, assume that lighting calculations have produced an illumination coefficient in the range 0.0 to 1.0 for a polygon, which is to be converted to an integer colour look-up table index, to reproduce the colour of the polygon at that particular illumination. It is a simple matter to store with the polygon the base index of the appropriate colour ramp, so as to define the basic colour (hue) of that polygon. Also recorded in the system is the size of each colour ramp (28 in the example above). The calculation of the look-up table index from the illumination coefficient is as follows.

First the illumination coefficient is scaled appropriately, multiplying it by the ramp size. Then a check is made to ensure that the illumination does not exceed the maximum representable. Finally the desired index value is simply calculated by adding the polygon colour base index to the scaled illumination value.

FIG. 21 illustrates schematically the operations involved to derive the colour index as described above. Firstly, lighting characteristics are calculated in the form of illumination coefficients ranging from 0.0 to 1.0, including for example an ambient illumination coefficient I(a), a diffuse illumination coefficient I(d) and a specular illumination coefficient I(s). These are combined at 210 into a single illumination coefficient ITOT. At 212 this is scaled in accordance with the ramp size, and also subjected to a check to ensure that it does not exceed the maximum within the ramp size. In other words, for a ramp size of 28, values which exceed 27 after scaling are set to 27. At 214, a base index determining the hue of polygon is received from the original polygon data and added to the scaled illumination coefficient ITOT'. This gives the appropriate 8-bit index value INDEX which is stored in the frame store at locations corresponding to the screen addresses x, y of the pixels falling within the relevant polygon.

To display the image, the index values are read from the frame store in a raster sequence and passed to the colour look-up table 218. Here they are finally converted to 24 bit colour values (for example 8 bits each r, g and b) and then to video signals, for display on the monitor. Equally, the values may be recorded as still pictures or as video images.

As a numerical example, assume that a cyan polygon is to be represented, and is illuminated with an illumination coefficient ITOT of 0.3. Further, assume that the ramp size is 28, and that the 28 entries forming the cyan colour ramp begin with entry number 150 in the colour look-up table (base index=150). The first step is to scale the illumination coefficient, that is to multiply 0.3 by the ramp size 28. This sets the scaled illumination level ITOT' to 8.4. Since the cyan colour ramp occupies entries from number 150 to number 150 plus 27, a check is made to ensure that the scaling has not increased the illumination value beyond 27, in which case ITOT' would be reduced back to 27. Finally the scaled illumination level 8.4 is added to the base index 150 for the cyan colour ramp, and rounded using integer arithmetic to give a colour look-up table index of 158.

By setting the coefficients of diffuse reflection to relatively low values, and exploiting the power-of-n non-linearity in the calculations of specular illumination, it is relatively easy to ensure that diffuse reflection effects do not cause the illumination values to reach the de-saturated part of the colour ramp, even when several diffuse illumination contributions (from several light sources) are combined into a single value for generating the look-up table index. Moreover, since the entire range of levels provides a steady increase in perceived brightness, the appearance will not be degraded seriously even when diffuse illumination leads to level values in the de-saturated part of the ramp.

It should also be noted, that the index value does not need to be calculated per pixel, in that it may be constant across a polygon, or may be derivable by interpolation across the polygon. In the latter case, it may be desirable to perform truncation to integer values after interpolation, however. Note also that the second type of embodiment described permits dynamic allocation of colour look-up table values and dynamic setting of ramp sizes, in a manner which is not possible when index values are rigidly divided into colour selection bits and level bits.

Many features of the preferred embodiments reduce the computational demands for a 3-dimensional interactive graphics engine. When taken together, they allow interactive 3-dimensional graphics to be generated using a common, programmable central processing unit, with effectively no requirement for purpose-built hardware. However, it should also be understood that many sub-combinations may be selected, so as to reduce the amount of purpose-built hardware required, thereby providing significant benefit.

The techniques disclosed herein are particularly suitable to interactive graphics environments. However, the techniques may also be employed in other graphics environments, such as non-interactive environments or real-time environments, where the speed of interactivity is perceived to be instantaneous.

What is claimed is:

1. Apparatus for processing image data representing multi-dimensional objects, said apparatus including a processor and a data store, wherein said data store stores data defining:

(a) a light source position;

(b) a viewing position;

(c) an arrangement of primitives defining one of said objects in a local space; and (d) a local transform for transforming said one of said objects into a viewable 3-dimensional space; and wherein said processor includes:

means for determining a set of view bounding planes defining a visible part of said viewable space visible from said viewing position;

means for defining a bounding volume for said one of said objects;

means for performing said local transform on said bounding volume;

means for determining to what extent said bounding volume is transformed into said visible part of said viewable space, and when said bounding volume is partially within said visible part, for storing information identifying which of said view bounding planes intersect said bounding volume;

means for performing said local transform on the primitives of said one of said objects to produce transformed primitives in said viewable space if said bounding volume is determined to be at least partially within said visible part; and means for clipping the transformed primitives of said one of said objects using said stored information identifying which of said view bounding planes intersect the bounding volume of said one of said objects.

2. Apparatus according to claim 1, wherein said bounding volume is a cuboidal bounding box defined by the extent of said one of said objects in three dimensions of said local space.

3. Apparatus according to claim 1, wherein said visible part of said viewable space has a shape which takes account of a perspective view.

4. A computer-useable medium storing computer-useable instructions for causing a processor in an image processing apparatus to process data defining (i) a light source position, (ii) a viewing position, (iii) an arrangement of primitives defining a multi-dimensional object in a local space, and (iv) a local transform for transforming said object into a viewable 3-dimensional space, the instructions comprising instructions for:

causing the processor to determine a set of view bounding planes defining a visible part of said viewable space from said viewing position;

causing the processor to define a bounding volume for said object;

causing the processor to perform said local transform on said bounding volume;

causing the processor to determine to what extent said bounding volume is transformed into said visible part of said viewable space, and, when said bounding volume is partially within said visible part, to store information identifying which of said view bounding planes intersect said bounding volume;

causing the processor to perform said local transform on the primitives of said object to produce 1transformed primitives in said viewable space if said bounding volume is determined to be at least partially within said visible part; and causing the processor to clip the transformed primitives of said object using said stored information identifying which of said view bounding planes intersect the bounding volume of said object.

5. In an apparatus for processing image data representing multi-dimensional objects, said apparatus having a data store storing data defining (i) a light source position, (ii) arranging position, (iii) an arrangement of primitives defining one of said objects in a local space, and (iv) a local transform for transforming said one of said objects into a viewable 3-dimensional space, a method of processing said data comprising the steps of:

(a) determining a set of view bounding planes defining a visible part of said viewable space from said viewing position;

(b) defining a bounding volume for said one of said objects;

(c) performing said local transform on said bounding volume;

(d) determining as to what extent said bounding volume is transformed into said visible part of said viewable space, and when said bounding volume is partially within said visible part, storing information identifying which of said view bounding planes intersect said bounding volume;

(e) performing said local transform on the primitives of said one of said objects to produce transformed primitives in said viewable space if said bounding volume is determined to be at least partially within said visible part; and (f) clipping the transformed primitives of said one of said objects using said stored information identifying which of said view bounding planes intersect the bounding volume of said one of said objects.

6. A method according to claim 5, wherein said bounding volume is a cuboidal bounding box defined by the extent of said one of said objects in three dimensions of said local space.

7. A method according to claim 5, wherein said visible part of said viewable space has a shape which takes account of perspective.

8. A method according to claim 5, further comprising the steps of:

(g) generating output data defining a view of said one of said objects; and (h) recording said output data.

9. A method according to claim 5, further comprising the step of generating an image signal representing a view of said one of said objects.

* * * * *

UNITED STATES PATENT AND TRADEMARK OFFICE
CERTIFICATE OF CORRECTION

PATENT NO. : 5,757,321

DATED : May 26, 1998

INVENTOR(S) : ADAM MICHAEL BILLYARD

Page 1 of 3

It is certified that error appears in the above-identified patent and that said Letters Patent is hereby corrected as shown below:

Title page,

<u>AT [73] ASSIGNEE</u>

"Canon Kabushiki Kaisha, Japan" should read
--Canon Kabushiki Kaisha, Tokyo, Japan--.

<u>COLUMN 2</u>

Figures 5A, 5B:
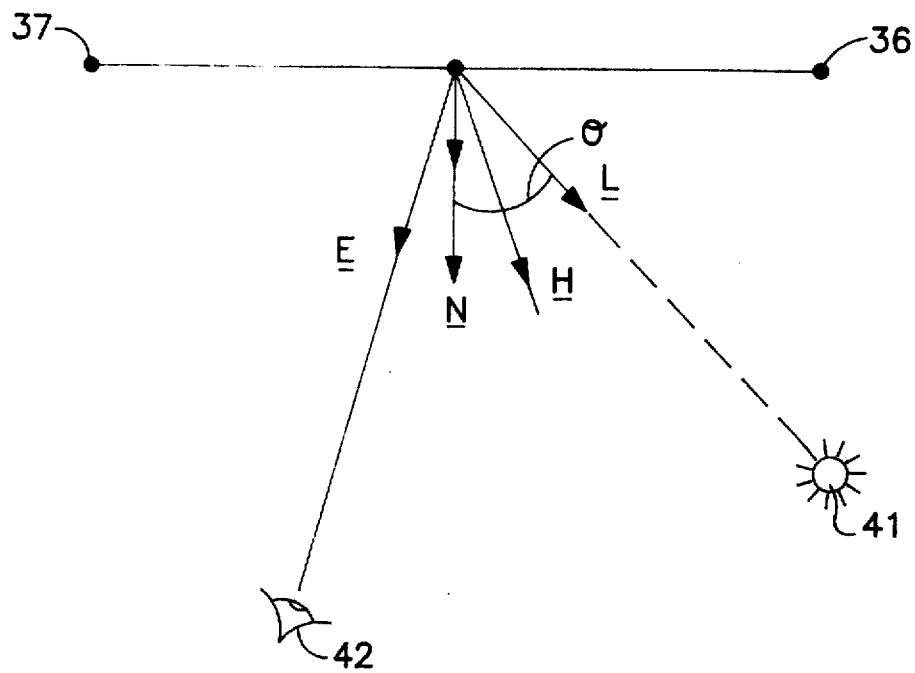
FIG. 5 illustrates techniques for calculating lighting characteristics from light source data, viewing data and surface parameters.

Line 30, "view point" should read --viewpoint--; and
Line 65, "FIG. 5 illustrates" should read
--FIGS. 5A and 5B illustrate--.

<u>COLUMN 3</u>

Line 33, "FIG. 20 illustrates" should read
--FIGS. 20A, 20B and 20C illustrate--.

<u>COLUMN 6</u>

Line 13, "25 which" should read --which--;
Line 22, "FIG. 5." should read --FIGS. 5A and 5B.--; and
Line 32, "FIG. 5." should read --FIG. 5B.--.

<u>COLUMN 7</u>

Line 6, "FIG. 5" should read --FIG. 5B--.

<u>COLUMN 9</u>

Line 47, "be reference" should read --by reference--.

UNITED STATES PATENT AND TRADEMARK OFFICE
CERTIFICATE OF CORRECTION

PATENT NO. : 5,757,321

DATED : May 26, 1998

INVENTOR(S) : ADAM MICHAEL BILLYARD

It is certified that error appears in the above-identified patent and that said Letters Patent is hereby corrected as shown below:

COLUMN 12

Line 51, "FIG. 5," should read --FIG. 5A,--.

COLUMN 13

Line 60, "FIG. 5," should read --FIGS. 5A and 5B,--.

COLUMN 14

Line 58, "FIG. 5" should read --FIGS. 5A and 5B--.

COLUMN 15

Line 60, "described;" should read --described,--.

COLUMN 17

Line 45, "Thus;" should read --Thus,--.

COLUMN 20

Line 42, "FIG. 20 illustrates" should read --FIGS. 20A, 20B and 20C illustrate--.

COLUMN 23

Line 43, "1transformed" should read --transformed--.

UNITED STATES PATENT AND TRADEMARK OFFICE
CERTIFICATE OF CORRECTION

PATENT NO. : 5,757,321
DATED : May 26, 1998
INVENTOR(S) : ADAM MICHAEL BILLYARD

It is certified that error appears in the above-identified patent and that said Letters Patent is hereby corrected as shown below:

COLUMN 24

Line 4, "arranging" should read --a viewing--.

Signed and Sealed this

Fourteenth Day of December, 1999

Q. TODD DICKINSON

Attest:

Attesting Officer

Acting Commissioner of Patents and Trademarks